United States Patent [19]

Dolezych et al.

[11] Patent Number: 5,026,230
[45] Date of Patent: Jun. 25, 1991

[54] LOAD LASHING DEVICE WITH TENSIONER FOR USE ON A FREIGHT CARRIER

[75] Inventors: Udo Dolezych, Im Grund 26, 5804 Herdecke; Rupprecht Graf, Frechen-Königsdorf, both of Fed. Rep. of Germany

[73] Assignee: Udo Dolezych, Herdecke, Fed. Rep. of Germany

[21] Appl. No.: 478,587

[22] Filed: Feb. 12, 1990

[51] Int. Cl.$^5$ ................................................ B60P 7/10
[52] U.S. Cl. ..................................... 410/100; 267/71; 410/96
[58] Field of Search .................. 410/96, 97, 100, 101, 410/103; 267/71, 150; 177/168, 169

[56] References Cited

U.S. PATENT DOCUMENTS

| 1,236,346 | 8/1917 | Pearson | 267/71 |
| 2,385,052 | 9/1945 | Birk et al. | 73/167 |
| 2,550,588 | 4/1951 | Oberholtzer | 73/141 |
| 2,649,299 | 8/1953 | Murphy, Jr. | 267/71 |
| 2,703,980 | 3/1955 | Tell | 73/141 |
| 3,373,830 | 3/1968 | Thomson | 177/168 |
| 3,678,866 | 7/1972 | O'Leary et al. | 410/100 |
| 4,314,783 | 2/1982 | Parnell et al. | 410/100 X |
| 4,587,852 | 5/1986 | Butler et al. | 73/826 |

FOREIGN PATENT DOCUMENTS 8215729 9/1982 Fed. Rep. of Germany .
3346755 7/1985 Fed. Rep. of Germany .

OTHER PUBLICATIONS

"Ladungs-Sicherung leicht gemacht" by H. Dantzer and H. Volkers, Oct. 1986.

Primary Examiner—Frank E. Werner
Assistant Examiner—Craig Slavin
Attorney, Agent, or Firm—Nils H. Ljungman & Associates

[57] ABSTRACT

A two piece load lashing compression device with tensioner for use on belts, bands and ropes on a freight carrier. Between the two metal pieces is located a compression spring which foreshortens under the load from the two pieces.

17 Claims, 6 Drawing Sheets

LOAD LASHING DEVICE WITH TENSIONER FOR USE ON A FREIGHT CARRIER

BACKGROUND OF THE INVENTION

1. Field of the Invention

This invention relates to a load lashing device with tensioner for use on a freight carrier for use with belts, bands, etc., with two components held at a variable distance from one another by means of a compression spring, as a function of the tensile stress. The two components, guided longitudinally and interlocked, enclose the compression spring between them.

Belts, bands, and similar clamping and lashing means are used in various operations to protect loads during transport. To provide sufficient protection against slipping or sliding of the load under the forces exerted on it during transport, as a function of the load weights and specified physical values, e.g., the coefficient of friction between the loading surface and the item being transported, the calculated gripping power or safety forces of the clamping or lashing means can be retained when the load is lashed down, obliquely or diagonally.

2. Description of the Prior Art

Appropriate calculation methods are described, for example, in the publication "Ladungs-Sicherung leicht gemacht" (Load Protection Made Easy), by H. Dantzer and H. Volkers, which appeared in October 1986 in the Wirtschaftsverlag NW, Verlag fuer neue Wissenschaft GmbH, Bremerhaven.

To meet the requirement of maintaining specified tensile stresses or safety forces on clamping or lashing means, such as belts and bands, it is necessary to have means to measure tensile stress forces. The prior art includes so-called ratchet spanners, by means of which the required tensile stresses can be both applied and measured in orders of magnitude from 100 up to several thousand kiloponds or daN.

To check the load or initial tension of clamping or lashing means, the prior art also includes so-called tension indicators.

For example, the German utility model 82 15 729.4 describes an apparatus to measure and indicate the tensile stress on clamping or lashing means, in particular lashing straps and cables, with a cylinder and at least one spring located therein. The apparatus of the prior art has, as the spring element, a disk spring or a packet of disk springs, which are braced against an abutment rigidly attached to the cylinder. The spring is pierced by a rod projecting out of the cylinder and the spring is engaged by the rod at the back. An indicator for the tensile stress is connected to the rod.

The disk spring packet is disadvantageous as a result of its short length, high load and limited dimensions. The result of such a configuration is a spring with a very steep load deformation curve and high spring constant C. This results in an extremely short travel of the spring system, with indications which are very imprecise and/or difficult to read.

The bolts running through the spring packet, which support a tensile load, also represent a significant safety risk, because they have a threaded portion at the articulated end of the lashing strap, and consequently have a weak point which is severely weakened by a reduction of fatigue strength and is therefore more likely to break. Such weak points can cause failures when extreme loads are exerted frequently.

The apparatus of the prior art therefore does not satisfactorily comply with the recognized rules of the art, in particular in terms of an apparatus which serves a safety function.

Another apparatus of the prior art with a ratchet to brace clamping or lashing means and an integrated initial tension indicator is described in Laid Open German Patent Application 33 46 755. In it the initial stress indicator can be displaced against an elastic force on at least one, and preferably two guides. Depending on the embodiment selected, in particular as shown in FIGS. 2 and 3, the force is introduced by means of a suspended part 79 and is transmitted by means of the initial tension indicator apparatus 39 to the body 60 of the apparatus by means of the compression springs 54. A load moment is thereby exerted on the guides 47, 48, and has an extraordinarily unfavorable effect on the sliding behavior of the interlocking guide elements, and produces a seizing action. The result is a significant reduction of the indication accuracy. The exposed arrangement of support springs of the indicator apparatus in a non-enclosed housing, and the possibility of dirt getting on the slides, are other potential causes of failure, and thus represent significant disadvantages.

OBJECT OF THE INVENTION

The object of this invention is an apparatus for the determination of a tensile stress on belts, straps, etc., which refines and improves on the prior art, to eliminate the abovementioned disadvantages.

SUMMARY OF THE INVENTION

The most important requirement is absolutely reliable, safe and secure operation, and the apparatus must be able to withstand even extreme overloads without any substantial risk of breaking.

The design and operation of the apparatus must also be as uncomplicated as possible, and it should therefore be possible to manufacture the apparatus economically.

It should also be as resistant as possible to the action of dirt, the effects of weathering or other external factors, and should preferably have a comparatively long travel of the spring system to improve the indicating and readability, and consequently greater precision for the determination of a tensile stress.

The guidance of the interlocked parts should also be improved so that in no case can load moments or similar influences have an adverse affect on the smooth operation of the apparatus. The initial spring tension at the zero point must also be adjustable using the simplest means.

The object is achieved by means of an apparatus for the determination of a tensile stress on belts, straps, etc., which comprises an apparatus for determining the tensile force in a first direction between a first end and a second end of belt arrangement, the apparatus comprising: a first generally U-shaped element having a transverse wall substantially transverse to the first direction and two side walls extending from the opposite ends of the transverse wall along the first direction toward the first end of the belt arrangement; each of the side walls of the first element having an extended end remote from the transverse wall; an arrangement for securing the extended ends of the side walls of the first element to the first end of the belt arrangement: a second generally U-shaped element having a transverse wall substantially transverse to the first direction and two side walls extending from opposite ends of the transverse wall along the first direction toward the second end of the belt arrangement; each of the side walls of the second element having an extended end remote from the transverse wall; an arrangement for securing the extended ends of the side walls of the second element to the second end of the belt arrangement; resiliently compressible biasing arrangement mounted between the transverse wall of the first element and the transverse wall of the second element; and arrangement for indicating the relative movement of the transverse wall of the first element and the transverse wall of the second element during compression of the biasing arrangement by the tensile force between the first end of the belt arrangement and the second end of the belt arrangement.

The functional parts of the apparatus, which are designed in the simplest possible manner, can be assembled loosely and are therefore adjustable, advantageously result in a smooth and extremely simple guidance with a high indication precision. The entire apparatus has been reduced to a few components, and can be manufactured very efficiently using only pressing techniques. It is also extremely economical to manufacture. Moreover, the apparatus is insensitive to external influences, because the spring is protected and enclosed by components.

A preferred embodiment of the invention is illustrated in the accompanying figures, which show additional advantageous details of the invention.

DESCRIPTION OF THE PREFERRED EMBODIMENTS

The apparatus for the determination of a tensile stress in belts, straps, etc., comprises two housing parts held at an adjustable distance from one another by means of a compression spring 29 as a function of the tensile stress "Z". The two housing parts are interlocked and guided longitudinally, and enclose the compression spring 29 of the type shown in FIGS. 8–10 between them, as shown schematically in the simplified FIG. 1, which shows the arrangement of the housing parts according to the invention.

The apparatus according to the invention comprises two housing parts 1 and 2, which are both U-shaped. Each has one comparatively short leg or transverse wall 3 or 6, and each has two comparatively long legs or sidewalls 4, 5 and 7, 8. The legs 3 to 8 are pivoted from one another by 90 degrees around the longitudinal axis X—X of the housing and are interlocked to form the housing 100 enclosing the compression spring 29 not shown in FIG. 1.

Figure 1:
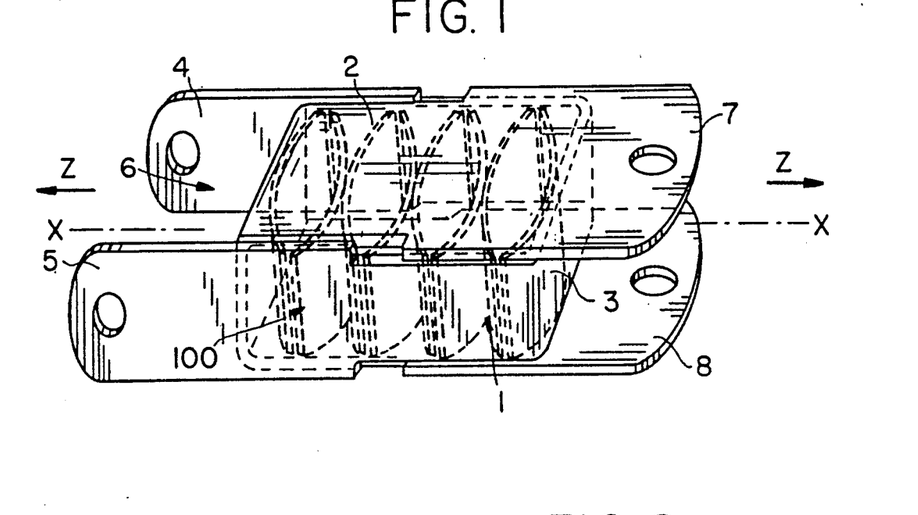
FIG. 1 is a perspective view of the simplest basic form of the apparatus.

The purely schematic illustration in FIG. 1 clearly shows the very simple and yet extremely efficient design of the basic elements of the apparatus according to the invention.

Figure 8:
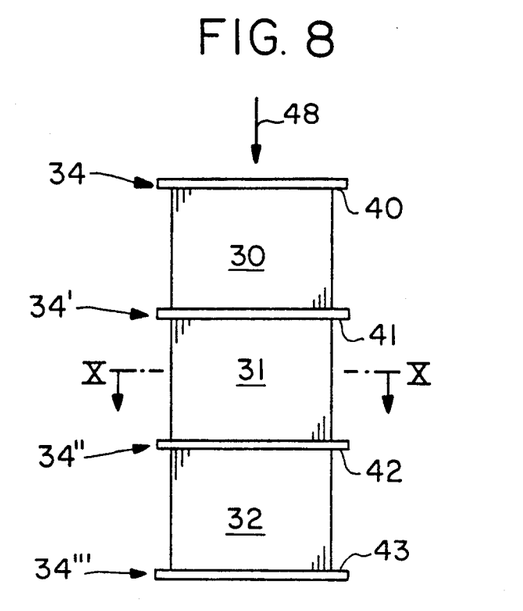
FIG. 8 is a rubber compression spring in a view from the wide side.
Figure 9:
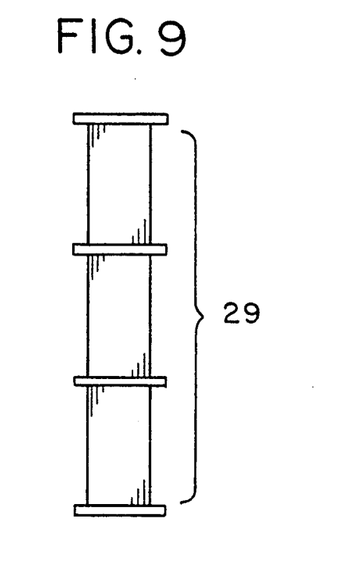
FIG. 9 shows the rubber spring in a view from the narrow side.
Figure 10:
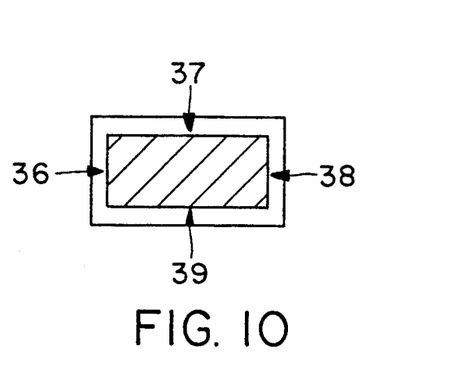
FIG. 10 is a cross section of the spring along X—X in FIG. 8

The figure shows that the housing parts 1, 2 with the long pairs of legs 4, 5 and 7, 8 pointing in opposite directions, overlap one another to a variable extent in the vicinity of the compression spring 29 schematically illustrated in FIGS. 8–10.

Figure 1A:
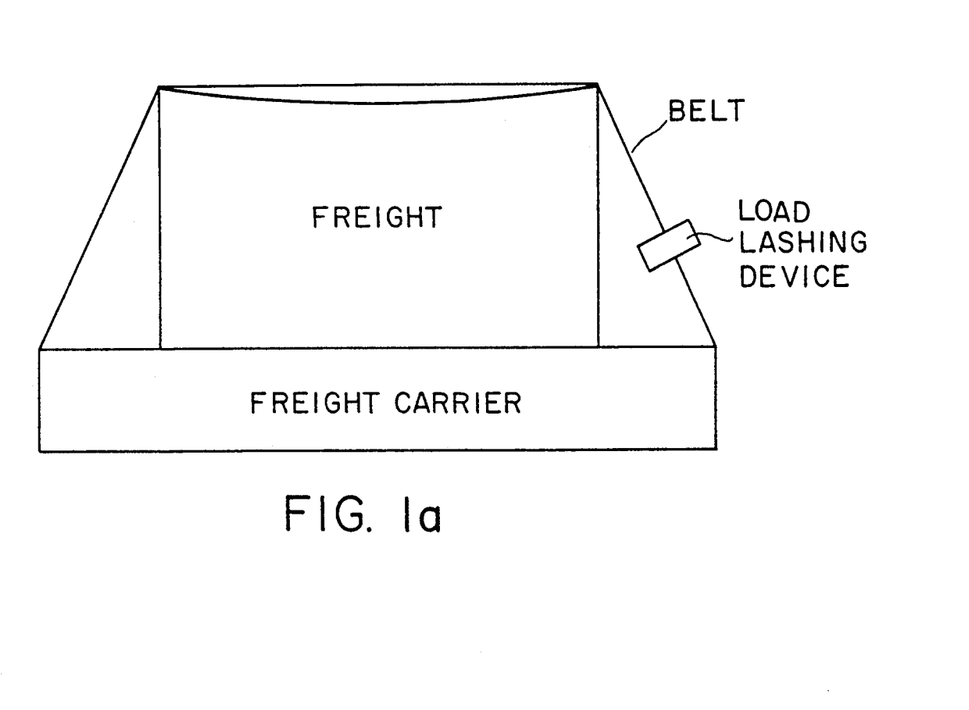
FIG. 1a a freight carrier with freight loaded thereon.

Now referring to FIG. 1a, a freight carrier is shown with freight loaded thereon. A belt secures the freight to the freight carrier. A load lashing device tensions the belt.

As shown in particular in FIGS. 2 to 7, each housing part 1 or 2 is designed in the vicinity of the overlap of the other housing part 2 or 1 forming the variable spring housing 100, with a recess 9a, 9b or 11a, 11b on its opposite transverse edges 19a, 19b or 21a, 21b as mutual slides for the housing parts 1 or 2.

Figure 2:
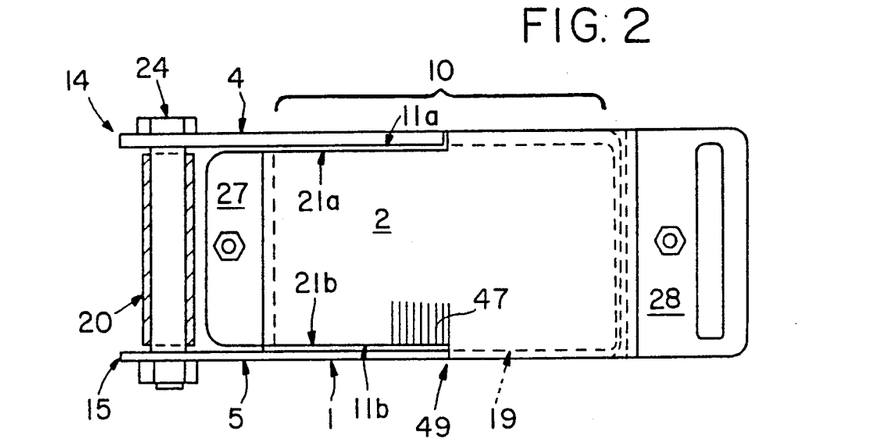
FIG. 2 is a plan view of the apparatus.
Figure 3:
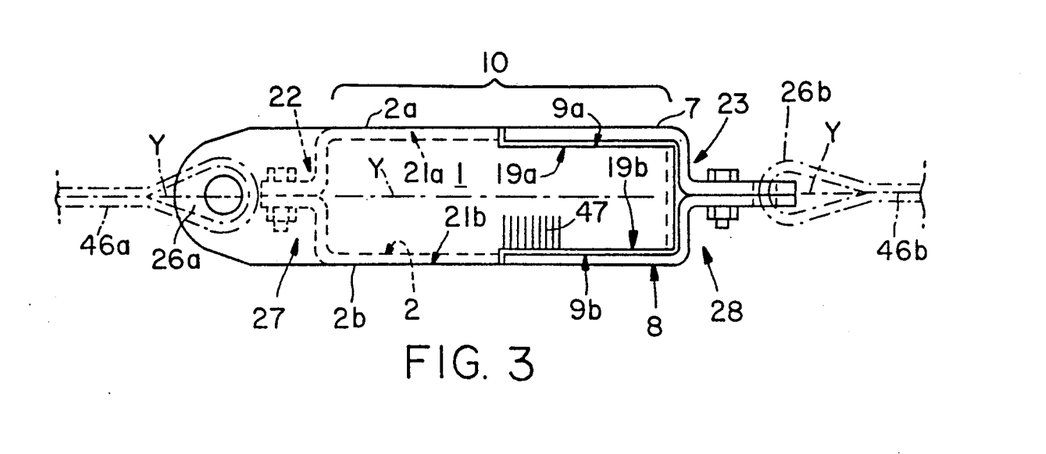
FIg. 3 is a side view of the apparatus.

As shown in particular in FIGS. 2 and 3, in which the housing parts 1 and 2 which are shown interlocked, the full-width terminal portions of the long legs 4, 5 of the housing part 1 overlap the two recesses 11a and 11b of the housing part 2. Likewise, the long legs 7 and 8 of the housing part 2, with their full-width ends, overlap the two recesses 11a and 11b of the housing part 1.

Therefore, in one embodiment, according to the invention of the housing parts 1 and 2, there are two comparatively long pairs of sliding guides, which together guide the housing parts 1 and 2 smoothly and absolutely securely in the longitudinal direction.

These guides have the further advantage that they require no maintenance and are unaffected by lateral forces, and therefore they function securely under all operating conditions. Together, they simultaneously form a spring housing which is closed on all sides.

As also shown in FIGS. 2 to 7, the recesses 9a, 9b and 11a, 11b designed as guides are located on the transverse edges 19a, 19b and 21a, 21b. Starting from approximately the middle of the overlap region 10 of two long pairs of legs 4, 5 or 7, 8, they run around the short leg 3 or 6 of each housing part 1 or 2.

Figure 4:
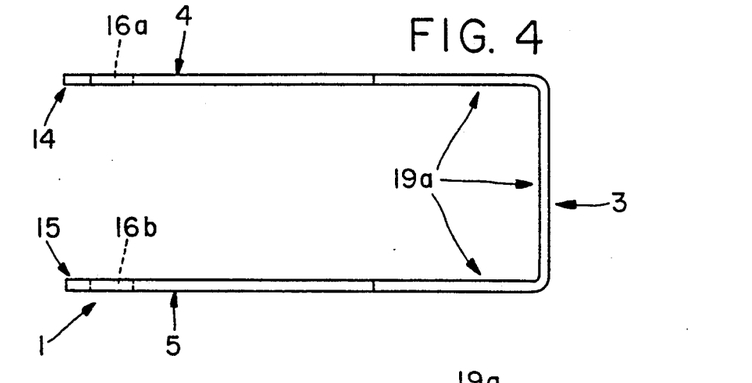
FIG. 4 is a plan view of a housing part.
Figure 5:
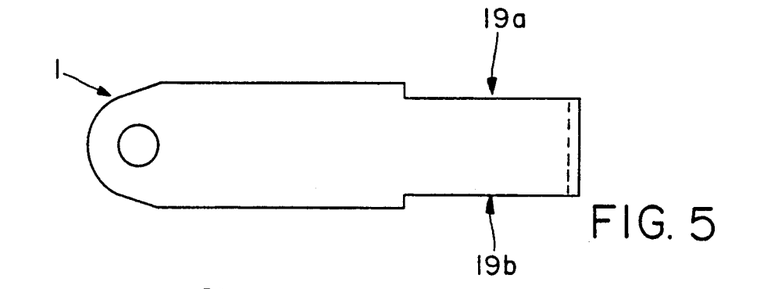
FIG. 5 is a side view of a housing part.

FIGS. 4 and 5 show that the housing part 1 is designed as a one-piece U-shaped sheet metal part. The plan view in FIG. 4 and the side view in FIG. 5 show that this part is designed as a stamped sheet metal part approximately 3 mm thick with a very uncomplicated and therefore extremely simple three-dimensional shape. This part 1 has a short leg or transverse wall 3 and two comparatively long legs 4 and 5. The long legs 4 and 5 are linear, and their free ends 14, 15 are provided with a pair of holes 16a, 16b which accept a wrist pin 24 (FIG. 2).

The wrist pin 24 connects the free ends 14, 15 with one another, with the interposition of a tubular spacer 20 (FIG. 2).

A loop 26a of the lashing strap 46a is then wrapped around this pin 24 with the tube segment 20 (FIG. 3).

Figure 6:
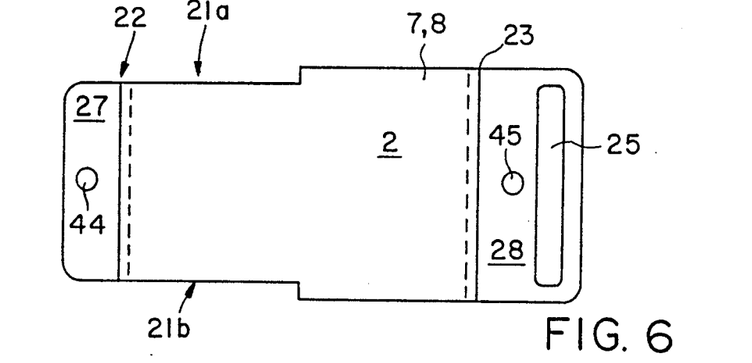
FIG. 6 shows one half of the housing part in a plan view.
Figure 7:
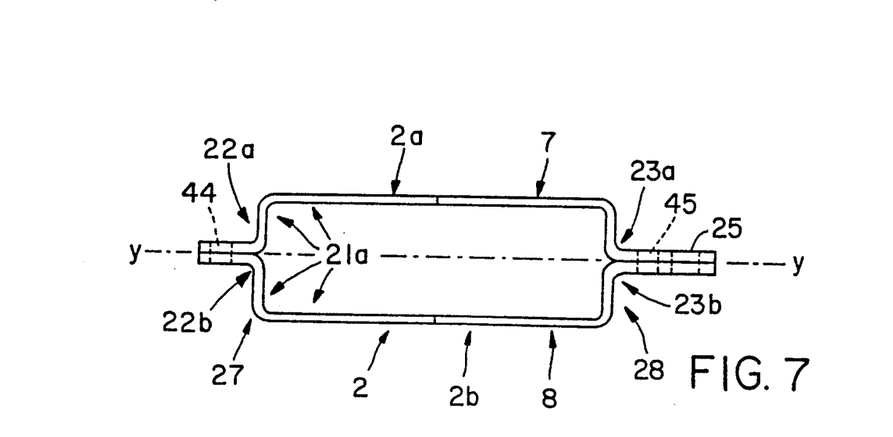
FIG. 7 is a side view of the housing part.

FIGS. 2 and 3, when considered together with FIGS. 6 and 7, show that the other housing part 2 comprises two halves 2a, 2b, divided along the longitudinal center plane Y—Y, and these two halves can be put together.

The rubber spring 29 can thereby be installed without any difficulty in the spring housing formed in the overlapping region 10 of the two housing parts 1 and 2.

The assembled halves 2a and 2b of the housing part 2 each have, on both ends 27, 28, joggles 22a, 22b and 23a, 23b with assembly holes 44, 45 and projecting toward the common plane of separation or longitudinal center plane Y—Y.

The joggle 23 opposite the wrist pin 24 is extended outward and has a slot 25 to hold a loop 26b of the lashing strap 46b.

In the vicinity of the joggle of part 1, on its narrow side, there is also an indicator scale 47 shown in FIGS. 2 and 3, and in connection with the edge 49, shown in FIG. 2, formed by the recess 19, it is possible to read the tension status.

Of course, instead of the indicator edge, there can also be another indicating means, such as a notch or a pointer in connection with an opposite scale 47 on one of the long legs 4, 5 or 7, 8.

The characteristic configuration of the rubber compression spring 29 is illustrated in FIGS. 8 to 10.

The spring 29 in the load direction 48 comprises at least three spring elements 30, 31, 32, which are located between the guide plates 34, 34', 34'', 34''' connected by these spring elements.

The number of spring elements in a series is a function of the spatial configuration and load of the individual elements, and of the overall length of the finished rubber compression spring 29.

Accordingly, two or significantly more than three spring elements can also be combined into one rubber compression spring. In this manner the spring characteristic or the so-called spring constant can be specified within broad limits, as a function of the particular application.

As illustrated, for correct and interference-free operation, a rubber compression spring 29 must have a spatial configuration with an appropriate ratio of length to cross section. A compression spring which is too long would be deflected sideways and deformed in an uncontrolled manner, thereby causing erroneous indications.

Divided and guided by means of guide plates according to the invention, the overall rubber spring 29, as shown in FIGS. 8 and 9, can have a very much more favorable length/cross section ratio, e.g., 2:1 or 3:1, without the danger of kinking.

It is therefore necessary, in the configuration of the invention, that the lateral surfaces 36 to 39 (FIG. 10) be designed with surrounding lateral distances recessed from the edges 40 to 43 of the guide plates 34.

Because the apparatus according to the invention simultaneously offers a maximum functional quality with a simple and compact construction, absolutely secure function, and since it can be fabricated economically, it can be considered an ideal solution to the problem discussed above.

Figures 11, 12:
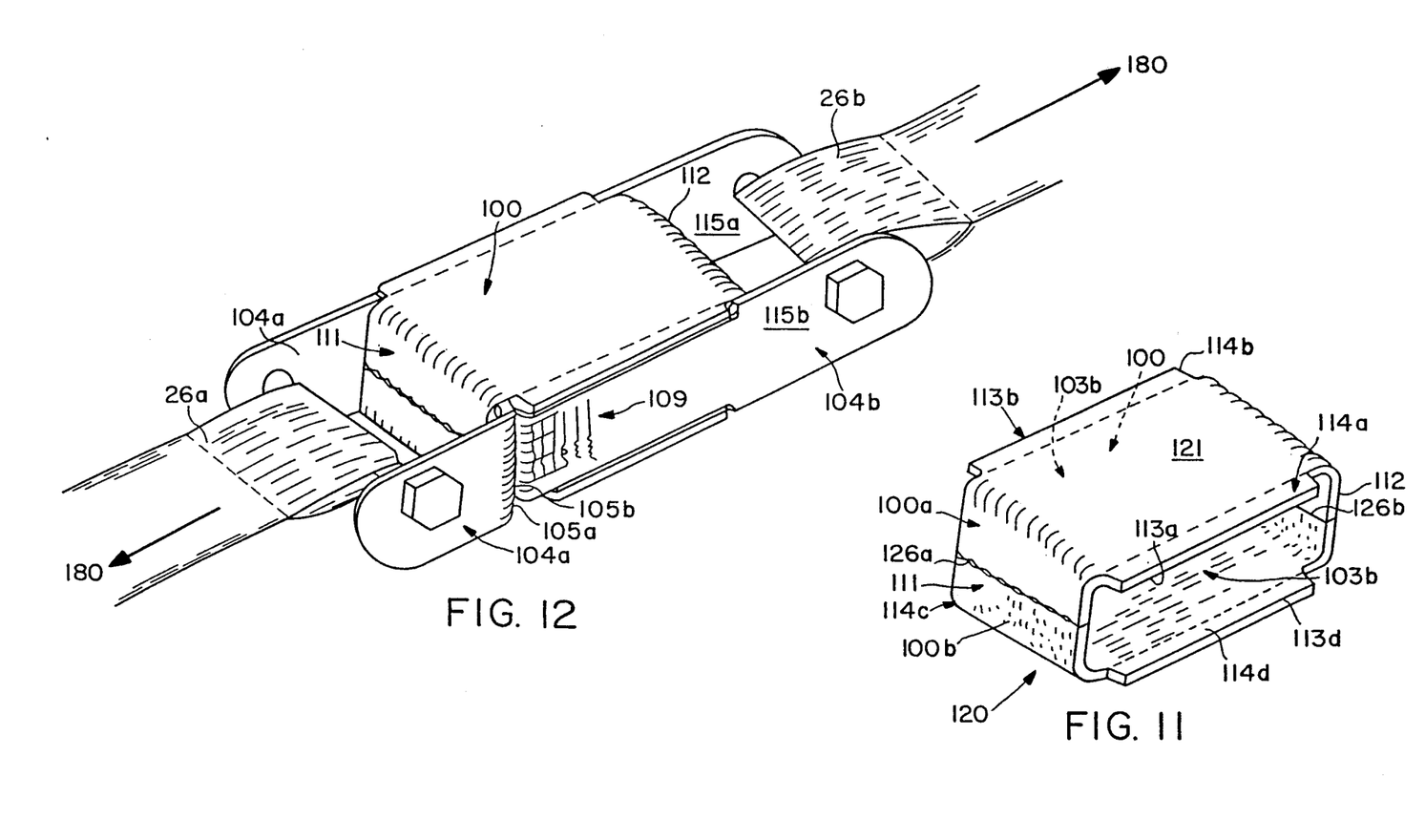
FIG. 11 is a perspective view of another housing part.
FIG. 12 is a perspective view of the apparatus.
Figure 13:
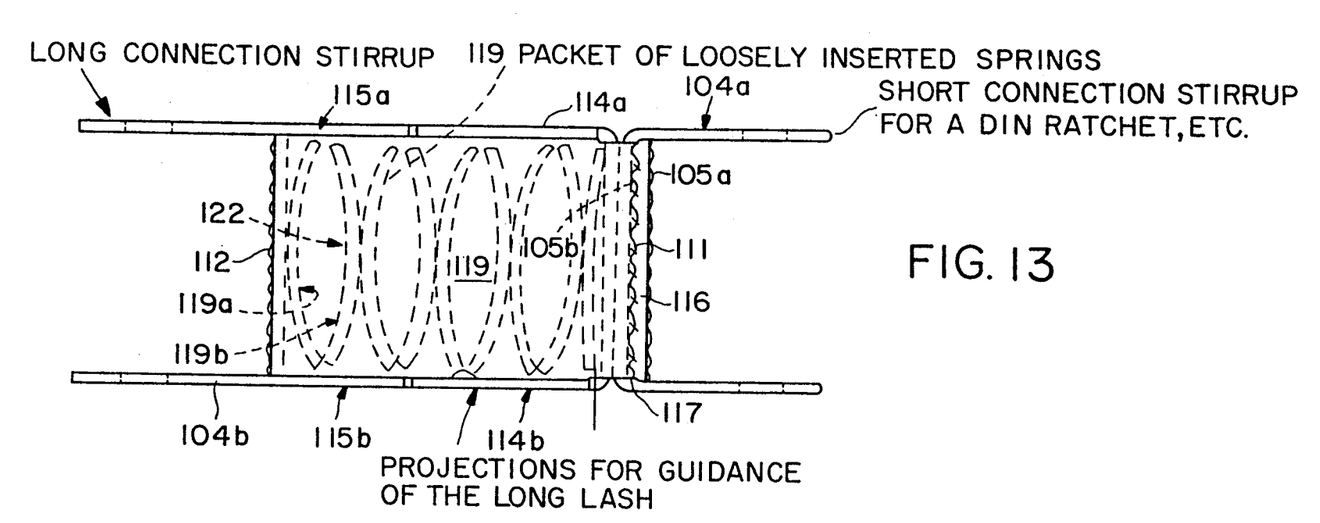
FIG. 13 is a plan view of the apparatus illustrated in FIG. 12.

FIGS. 11 to 13 illustrate another alternate configuration of the apparatus, which is explained in greater detail below.

In this case, as shown in FIG. 11, a housing part 100 is open on the long sides 103a, 103b, without any walls, in the tension direction 180. The tension stirrups are thereby inserted with their transverse webs 105a, 105b back to back on the first transverse wall 111 of the housing part 100 loosely into the latter. The measurement spring arrangement 119, shown in detail in FIG. 13, is also loosely inserted between the transverse web 111 of the tension stirrup 104b and the second transverse wall 112 of the housing part 100.

The result is a highly-efficient, simple apparatus which can be fabricated with extremely uncomplicated equipment and means, and which is very simple to install, all of which represent significant advantages over the prior art.

One characteristic of this invention is the possibility of a simple adjustment of the spring indicating range because, on account of another characteristic of the invention, the long edges 113a, 113b located parallel to and at some distance from one another of the two open long sides 103a, 103b of the housing part 100 are designed with projecting guide webs 114a, 114b, 114c, 114d for the longitudinal webs 115a, 115b of the tension stirrup 104b guided between them. Between the first transverse wall 111 of the housing part 100 and the transverse web 105a of the tension stirrup 104a, there is an adjustment space 117 holding an adjustment disc or plate 116 to set a defined initial spring tension at the zero point.

The housing part, in a plane Z—Z transverse to the direction of tension 180, has a rectangular cross section.

The result is a very sturdy and compact design, which simplifies fabrication.

The housing part 100 also comprises a rectangular base surface 120 and cover, and is open on the two long sides 103a, 103b.

It is of very great advantage for ease of fabrication, assembly and adjustment if, according to the invention, the housing part 100 is constructed of two identical halves 100a, 100b, which are assembled after the insertion of components 104a, 104b, 119, and then connected together with flanges by means of screws, or without flanges by means of weld seams.

Figure 14:
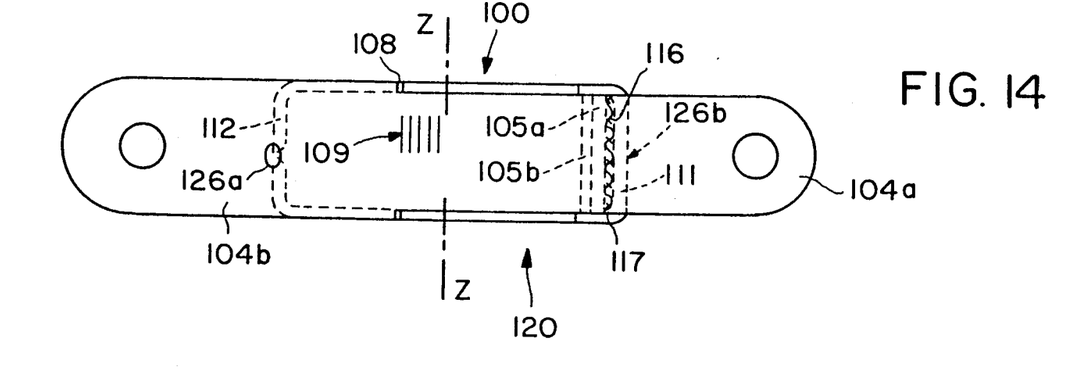
FIG. 14 is a plan view of the apparatus illustrated in FIG. 12.

FIGS. 13 and 14 show a further simplification and improvement over the prior art which can be achieved by having the measurement spring arrangement 119 consist of a packet of loose, individual, stacked leaf springs 119a, 119b, 119c, etc.

Because these leaf springs 119a, etc., are not rigidly connected to any component of the apparatus, an uncomplicated zeropoint adjustment can be achieved by backing up the measurement spring arrangement 119 with the adjustment plates 116, an arrangement which has considerable advantages in terms of facilitating the assembly and installation, and therefore improves the quality on the one hand and reduces manufacturing costs on the other hand.

The leaf springs 119a, etc., can be fabricated from spring steel strip and can be forced or bent into the shape of a suspension bridge 122. They are always diametrically opposed, i.e., either back to back or loosely layered with the front sides against one another, as shown by way of example in FIG. 13.

The longitudinal webs 115a, 115b of the tension stirrup 104b, which can move between the guide webs 114a, 114b under load proportionally to the load, each have an indicator scale 109 with lines and/or numbers to indicate the applied tensile forces in the direction 180, which can be read relative to a fixed mark 108 or marks on the guide webs 114a, 114b, etc.

In summing up, one aspect of the invention resides in an apparatus for the determination of the tensile stress in belts, bands, etc., the components of which execute relative motions which are proportional to the load, and the distance between which changes, by means of a measurement spring arrangement as a function of an applied load, with a housing part and on both sides of the latter at some distance from it in the direction of tension, there are tension stirrups comprising two parallel long legs and a transverse leg connecting the latter, and the tension stirrups have, on their free ends, in opposite holes, connecting pins for coupling the lashing means, characterized by the fact that the housing part 100 is open and wall-less on the longitudinal sides 103a, 103b running in the tension direction 180, and that the tension stirrups 104a, 104b are inserted in the housing part 100 with their transverse webs 105a, 105b back to back on the first transverse wall 111 of the housing part 100, and the measurement spring arrangement 119 is inserted loosely between the transverse web 105b of the tension stirrup 104b and the second transverse wall 112 of the housing part 100.

Another aspect of the invention resides in the fact that between the first transverse wall 111 of the housing part 100 and the transverse web 105a of the tension stirrup 104a, there is an adjustment space 117 holding an adjustment disc or plate 116 to set a defined initial spring tension at the zero point.

Yet another aspect of the invention resides in the fact that the longitudinal edges 113a, 113b, parallel to and at a distance from another, of the two open long sides 103a, 103b of the housing part 100 are designed with projecting guide webs 114a, 114b, 114c, 114c for the parallel long webs 115a, 115b of the tension stirrup 104b which slide and are guided between them.

A further aspect of the invention resides in the fact that the housing part 100 has a rectangular cross section in a plane Z—Z transverse to the tension direction.

A yet further aspect of the invention resides in the fact that the housing part 100 has a base surface 120 and cover surface 121, both of which are rectangular, and is open on both lateral long sides 103a, 103b.

A yet further aspect of the invention resides in the fact that the housing part 100 comprises two identical hemispheres 100a, 100b, which can be assembled after the insertion of the components 104a, 104b, 119, and bolted together by means of flanges, or can be welded together by means of weld seams 126a, 126b.

Yet another further aspect of the invention resides in the fact that the measurement spring arrangement 119 consists of a packet of loosely layered individual leaf springs 119a, 119b, 119c, etc.

An additional aspect of the invention resides in the fact that the leaf springs 119a, etc., are fabricated from flat spring steel bank and are forced or bent into the shape of a suspension bridge 122.

A yet additional aspect of the invention resides in the fact that the leaf springs 119a, etc., are all diametrically opposed, i.e. they are loosely stacked either back to back or with the front sides opposite one another.

A further additional aspect of the invention resides in the fact that the long webs 115a, 115b of the tension stirrup 104b which are guided and which can move between the guide webs 114 under a load relative to the latter, each have an indicator scale 109 with lines and-/or numbers to indicate the applied tensile forces 180, which can be read relative to a fixed marking 108 or marks on the guide webs 114a to 114d.

A yet further aspect of the invention resides in the fact that the apparatus has tension stirrups with U-shaped longitudinal 4, 5 and 7, 8 and transverse legs 3, 6, and these are interlocked with legs 3 to 8 pivoted by 90 degrees from one another around the longitudinal axis X—X... and enclose the measure spring apparatus 29 (FIG. 1).

A yet further additional aspect of the invention resides in the fact that the tension stirrups 1, 2 in the vicinity of their overlap 10 each have a recess 9a, 9b or 11a, 11b of the transverse edges 19a, 19b or 21a, 21b opposite one another, which act as as mutual slide guides.

Another further additional aspect of the invention resides in the fact that the guide recesses 9 and 11 on the transverse edges 19a, 19b and 21a, 21b, from approximately the middle of the overlap region 10, go around the short legs 3, 6 of the tension stirrups 1, 2.

A yet another aspect of the invention resides in the fact that moldings 2a, 2b forming a housing part have, on both ends 27, 28 have joggles 22, 23 projecting toward the common separation plane Y—Y and provided with holes 44, 45, whereby the joggle 23 opposite a wrist pin 24 extends outward with a flange and has a slot 25 to hold a belt loop 26.

A still further aspect of the invention resides in the fact that the measurement spring arrangement 29 is a rubber spring comprising at least two spring elements 30, 31, etc., which are connected by guide plates 34.

The invention as described hereinabove in the context of the preferred embodiments is not to be taken as limited to all of the provided details thereof, since modifications and variations thereof may be made without departing from the spirit and scope of the invention.

What is claimed is:

1. Load lashing device with tensioner for use on a freight carrier having tensioning in a first direction between a first end and a second end of belt means comprising;

a first generally U-shaped element having a transverse wall substantially transverse to said first direction and two side walls extending from the opposite ends of said transverse wall along said first direction toward said first end of said belt means;

each of said side walls of said first element having an extended end remote from said transverse wall;

means for securing said extended ends of said side walls of said first element to said first end of said belt means;

a second generally U-shaped element having a transverse wall substantially transverse to said first direction and two side walls extending from opposite ends of said transverse wall along said first direction toward said second end of said belt means;

each of said side walls of said second element having an extended end remote from said transverse wall;

means for securing said extended ends of said side walls of said second element to said second end of said belt means;

said first and second U-shaped elements being positioned in interlocking relation with said sidewalls of said first and second elements positioned in overlapping relation and said respective transverse walls positioned oppositely of one another in spaced relation to form a housing;

said side walls of said first element each having a recess extending longitudinally on said side wall from said transverse wall to an edge spaced from said extended end remote from said transverse wall, said recesses on said side walls of said first element forming a slide;

said side walls of said second element each having a recess extending longitudinally on said side wall from said transverse wall to an edge spaced from said extended end remote from said transverse wall, said recesses on said side walls of said second element forming a slide;

said side walls of said first element being positioned on said slide of said second element side walls and said side walls of said second element being positioned on said slide of said first element side walls;

resiliently compressible biasing means disposed loosely between said transverse wall of said first element and said transverse wall of said second element within said housing;

said biasing means exerting a force on said oppositely positioned transverse walls with said respective side walls being guided in a longitudinal direction by movement on said respective slides of said first and second elements, and;

means for indicating the relative movement of said transverse wall of said first element and said transverse wall of said second element during compression of said biasing means by a tensile force applied between said first end of said belt means and said second end of said belt means.

2. Load lashing apparatus with tensioner for use on a freight carrier having tensioning in a first direction between a first end and a second end of belt means, said belt means including a width dimension and a thickness dimension, said width dimension corresponding to a major surface and said thickness dimension corresponding to an edge surface, said width dimension being substantially greater than said thickness dimension, said apparatus comprising:

a first element having a generally U-shaped portion and having a transverse wall substantially transverse to said first direction and two sidewalls extending from the opposite ends of said transverse wall along said first direction toward said first end of said belt means;

each of said sidewalls of said first element having an extended end remote from said transverse wall;

means for securing said extended ends of said sidewalls of said first element to said first end of said belt means.

said means for securing said extended ends of said sidewalls of said first element to said first end of said belt means including an additional transverse wall joining said extended ends and means for securing said additional transverse wall to said first end of said belt means;

a second generally U-shaped element having a transverse wall substantially transverse to said first direction and two sidewalls extending from opposite ends of said transverse wall along said first direction toward said second end of said belt means;

each of said sidewalls of said second element having an extended end remote from said transverse wall;

means for securing said extended ends of said sidewalls of said second element to said second end of said belt means;

resiliently compressible biasing means disposed loosely between said transverse wall of said first element and said transverse wall of said second element;

means for indicating the relative movement of said transverse wall of said first element and said transverse wall of said second element during compression of said biasing means by a tensile force applied between said first end of said belt means and said second end of said belt means;

means for producing a predetermined biasing of said biasing means including a spacer means located between said additional transverse wall of said first element and said transverse wall of said second element to establish a predetermined location of said transverse wall of said first element relative to said transverse wall of said second element, said predetermined location causing initial compression of said biasing means independent of said tensile force between said first end of said belt and said second end of said belt;

said two sidewalls of said first element respectively extending along each of a first pair of opposite sides of said biasing means;

said two sidewalls of said second element respectively extend along each of a second pair of opposite sides of said biasing means;

said transverse walls and said sidewalls of said first and said second elements generally encasing said biasing means;

said sidewalls of said first element being parallel one with the other and perpendicular to said sidewalls of said second element which are parallel one with the other;

said sidewalls of said first element for being parallel with said major surface of said belt means;

said sidewalls of said second element for being parallel with said edge surface of said belt means;

said sidewalls of said first element being flat and having a first outside dimension being parallel with said width dimension of said belt means;

said sidewalls of said second element being flat and having a second outside dimension for being parallel with said thickness dimension of said belt means;

said first outside dimension being greater than said second outside dimension.

3. Apparatus according to claim 1, wherein said two side walls of said first element respectively extend along each of first pair of opposite sides of said biasing means and said two side walls of said second element respectively extend along each of a second pair of opposite sides of said biasing means.

4. Apparatus according to claim 1, wherein said transverse walls and said side walls of said first and said second elements generally encase said biasing means.

5. Apparatus according to claim 1, wherein said side walls of said first element are parallel one with the other and perpendicular to said side walls of said second element which are parallel one with the other.

6. Apparatus according to claim 5, including between one of said transverse wall of said first element and said transverse wall of said second element and one end of said loosely disposed biasing means, means for adjusting an initial biasing tension of said apparatus.

7. Apparatus for assisting in securing a load during transport and also for determining the tensile force in a first direction between a first end and a second end of belt means, said belt means also for assisting in securing the load during transport, said belt means including a width dimension and a thickness dimension, said width dimension corresponding to a major surface and said thickness dimension corresponding to an edge surface, said width dimension being substantially greater than said thickness dimension, said apparatus comprising:

a first element having a generally U-shaped portion and having a transverse wall substantially transverse to said first direction and two sidewalls extending from the opposite ends of said transverse wall along said first direction toward said first end of said belt means;

each of said sidewalls of said first element having an extended end remote from said transverse wall;

means for securing said extended ends of said sidewalls of said first element to said first end of said belt means;

said means for securing said extended ends of said sidewalls of said first element to said first end of said belt means including an additional transverse wall joining said extended ends and means for securing said additional transverse wall to said first end of said belt means;

a second generally U-shaped element having a transverse wall substantially transverse to said first direction and two sidewalls extending from opposite ends of said transverse wall along said first direction toward said second end of said belt means;

each of said sidewalls of said second element having an extended end remote from said transverse wall;

means for securing said extended ends of said sidewalls of said second element to said second end of said belt means:

resiliently compressible biasing means loosely disposed between said transverse wall of said first element and said transverse wall of said second element;

means for indicating the relative movement of said transverse wall of said first element and said transverse wall of said second element during compression of said biasing means by said tensile force between said first end of said belt means and said second end of said belt means;

said two sidewalls of said first element respectively extending along each of a first pair of opposite sides of said biasing means;

said two sidewalls of said first element being planar and also being substantially rectangular:

said two sidewalls of said second element respectively extend along each of a second pair of opposite sides of said biasing means;

said two sidewalls of said second element being planar and also being substantially rectangular;

said transverse walls and said sidewalls of said first and said second elements generally encasing said biasing means:

said sidewalls of said first element being parallel one with the other and perpendicular to said sidewalls of said second element which are parallel one with the other;

said sidewalls of said first element for being parallel with said major surface of said belt means:

said sidewalls of said second element for being parallel with said edge surface of said belt means;

said sidewalls of said first element being flat and having a first outside dimension being parallel with said width dimension of said belt means;

said sidewalls of said second element being flat and having a second outside dimension for being parallel with said thickness dimension of said belt means;

said first outside dimension having a maximum dimension being substantially greater than said second outside dimension at its maximum dimension; and said apparatus being substantially rectangularly parallelopiped shaped:

between one of said transverse wall of said first element and said transverse wall of said second element and one end of said loosely disposed biasing means, means for adjusting an initial biasing tension of said apparatus;

wherein said means for indicating the relative movement of said transverse walls includes an indicator scale on at least one of said side walls of one of said first and said second elements, said indicator scale being aligned with a mark of an adjacent said side wall of the other of said first and said second elements.

8. Apparatus according to claim 7, wherein said means for adjusting includes a plate disposed between one end of the biasing means and one of said transverse wall of said first element and said transverse wall of said second element.

9. Apparatus according to claim 1, wherein said means for indicating the relative movement of said transverse walls includes an indicator scale on at least one of said side walls of one of said first and said second elements, said indicator scale being aligned with a mark of an adjacent said side wall of the other of said first and said second elements.

10. Apparatus according to claim 2, wherein said biasing means includes leaf spring means.

11. Apparatus according to claim 1, wherein said biasing means includes leaf spring means.

12. Apparatus according to claim 10, wherein said leaf spring means includes a plurality of generally arcuate leaf springs each having opposite ends and a curved center, each said leaf spring being aligned for contact with a first adjacent one of said leaf springs at corresponding opposite ends of each: each said leaf spring being aligned for contact with a second adjacent one of said leaf springs at the curved centers of each.

13. Apparatus according to claim 10, wherein said leaf spring means includes a plurality of generally arcuate leaf springs each having opposite ends and a curved center, each said leaf spring being aligned for contact with a first adjacent one of said leaf springs at corresponding opposite ends of each; each said leaf spring being aligned for contact with a second adjacent one of said leaf springs at the curved centers of each.

14. Apparatus according to claim 2, wherein said biasing means includes at least two biasing members which are joined by a guide plate disposed therebetween, said guide plate being generally perpendicular to said first direction and having peripheral portions which are aligned with corresponding interior surfaces of said side walls for sliding contact therewith to maintain said biasing members in position relative to said transverse walls during the relative movement of said first element and said second element.

15. Apparatus according to claim 2, wherein said biasing means includes at least two biasing members which are joined by a guide plate disposed therebetween, said guide plate being generally perpendicular to said first direction and having peripheral portions which are aligned with corresponding interior surfaces of said side walls for sliding contact therewith to maintain said biasing members in position relative to said transverse walls during the relative movement of said first element and said second element.

16. Apparatus according to claim 1, wherein said means for securing said extended ends of said side walls of said first element to said first end of said belt means includes an additional transverse wall joining said extended ends; and means for securing said additional transverse wall to said first end of said belt means.

17. Apparatus for lashing a load on a freight carrier having tensioning in a first direction between a first end and a second end of belt means comprising;

a first generally U-shaped element having a transverse wall substantially transverse to said first direction and two side walls extending from the opposite ends of said transverse wall along said first direction toward said first end of said belt means;

each of said side walls of said first element having an extended end remote from said transverse wall;

means for securing said extended ends of said side walls of said first element to said first end of said belt means;

a second generally U-shaped element having a transverse wall substantially transverse to said first direction and two side walls extending from opposite ends of said transverse wall along said first direction toward said second end of said belt means;

each of said side walls of said second element having an extended end remote from said transverse wall;

means for securing said extended ends of said side walls of said second element to said second end of said belt means;

resiliently compressible biasing means disposed loosely between said transverse wall of said first element and said transverse wall of said second element;

means for indicating the relative movement of said transverse wall of said first element and said transverse wall of said second element during compression of said biasing means by said tensile force between said first end of said belt means and said second end of said belt means;

means for securing said extended ends of said side walls of said first element to said first end of said belt means includes an additional transverse wall joining said extended ends; means for securing said additional transverse wall to said first end of said belt means; and means for producing a predetermined biasing of said biasing means including a spacer means located between said additional transverse wall of said first element and said transverse wall of said second element to establish a predetermined location of said transverse wall of said first element relative to said transverse wall of said second element, said predetermined location causing initial compression of said biasing means independent of said tensile force between said first end of said belt means and said second end of said belt means.

* * * * *

UNITED STATES PATENT AND TRADEMARK OFFICE
CERTIFICATE OF CORRECTION

PATENT NO. : 5,026,230

DATED : June 25, 1991

INVENTOR(S) : Udo DOLEZYCH and Rupprecht GRAF

It is certified that error appears in the above-identified patent and that said Letters Patent is hereby corrected as shown below:

On the title page: immediately after INID code section [22], insert INID code section [30] as follows:

--[30]    Foreign Application Priority Data

April 18, 1987    [DE]  Fed. Rep. of Germany .... 3713195
    Nov. 2, 1987      [DE]  Fed. Rep. of Germany .... 3737120--.

immediately after the INID code section [30], as presented immediately above, insert a INID code section [63] as follows:

--Related U.S. Application Data

[63]  Continuation of Ser. No. 182,688, filed on April 18, 1988, abandoned.--.

UNITED STATES PATENT AND TRADEMARK OFFICE
CERTIFICATE OF CORRECTION

PATENT NO. : 5,026,230

DATED : June 25, 1991

INVENTOR(S) : Udo DOLEZYCH and Rupprecht GRAF

It is certified that error appears in the above-identified patent and that said Letters Patent is hereby corrected as shown below:

In column 1, after the title, on line 4, insert the following:

--CROSS-REFERENCE TO RELATED APPLICATIONS

This application is a continuation-in-part of U.S. Application No. 07/182,688 filed on April 18, 1988, now abandoned, which claims priority from Federal Republic of Germany Patent Application No. P 37 13 195.8 filed on April 18, 1987, and Federal Republic of Germany Patent Application No. P 37 37 120.7 filed on November 2, 1987.--

In column 2, line 30, after 'the', delete "abovementioned" and insert --above-mentioned--.

In column 2, line 47, after 'improved', insert --,--.

In column 2, line 65, after 'arrangement', delete ":" and insert --;--.

UNITED STATES PATENT AND TRADEMARK OFFICE
CERTIFICATE OF CORRECTION

PATENT NO. : 5,026,230

DATED : June 25, 1991

INVENTOR(S) : Udo DOLEZYCH and Rupprecht GRAF

It is certified that error appears in the above-identified patent and that said Letters Patent is hereby corrected as shown below:

In column 3, line 9, after 'element', delete ":", and insert --;--.

In column 3, line 30, before 'DESCRIPTION', insert --BRIEF--.

In column 3, line 32, after 'apparatus', delete "." and insert --;--.

In column 3, line 37, after 'part', delete ":" and insert --;--.

In column 3, line 40, after 'part', delete ":" and insert --;--.

In column 3, line 42, after 'side', delete ":" and insert --;--.

In column 3, line 46, after '8', insert --;--.

UNITED STATES PATENT AND TRADEMARK OFFICE
CERTIFICATE OF CORRECTION

PATENT NO. : 5,026,230

DATED : June 25, 1991

INVENTOR(S) : Udo DOLEZYCH and Rupprecht GRAF

It is certified that error appears in the above-identified patent and that said Letters Patent is hereby corrected as shown below:

In column 3, line 48, after 'apparatus', delete ":" and insert --;--.

In column 4, line 44, after 'as', delete "guides" and insert --guide webs--.

In column 5, line 68, after 'transverse', delete "web" and insert --wall--.

In column 8, line 1, after 'the', delete "measure" and insert --measurement--.

Column 9
In Claim 2, line 40, after 'means', delete "." and insert --;--.

Column 11
In Claim 7, line 23, after 'means', delete ":" and insert --;--.

UNITED STATES PATENT AND TRADEMARK OFFICE
CERTIFICATE OF CORRECTION

PATENT NO. : 5,026,230

DATED : June 25, 1991

INVENTOR(S) : Udo DOLEZYCH and Rupprecht GRAF

It is certified that error appears in the above-identified patent and that said Letters Patent is hereby corrected as shown below:

Column 11,

In Claim 7, line 38, after 'rectangular', delete ":" and insert --;--.

In Claim 7, line 52, after 'means', delete ":" and insert --;--.

Column 12,

In Claim 7, line 66, after 'shaped', delete ":" and insert --;--.

In Claim 12, line 32 after the first instance of 'each', delete ":" and insert --;--.

Signed and Sealed this

Twenty-fourth Day of August, 1993

Attest:

BRUCE LEHMAN

*Attesting Officer*  *Commissioner of Patents and Trademarks*